United States Patent
Wollum et al.

(10) Patent No.: US 6,417,270 B1
(45) Date of Patent: Jul. 9, 2002

(54) MEANS OF PRODUCING HIGH DIBLOCK CONTENT THERMOPLASTIC ELASTOMERS WITH FUNCTIONAL TERMINATION

(75) Inventors: Mark H. Wollum, Wilmington, NC (US); Daniel F. Graves, Canal Fulton, OH (US)

(73) Assignee: Firestone Polymers, LLC, Akron, OH (US)

( * ) Notice: Subject to any disclaimer, the term of this patent is extended or adjusted under 35 U.S.C. 154(b) by 0 days.

(21) Appl. No.: 09/757,140

(22) Filed: Jan. 9, 2001

(51) Int. Cl.$^7$ ............................................. C08F 255/06
(52) U.S. Cl. ...................... 525/98; 525/314; 525/316; 525/271
(58) Field of Search ........................ 525/98, 314, 316, 525/271

(56) References Cited

U.S. PATENT DOCUMENTS

| | | |
|---|---|---|
| 3,646,161 A | 2/1972 | Marwede et al. |
| 4,212,910 A | 7/1980 | Taylor et al. |
| 4,250,273 A | 2/1981 | Bohm et al. |
| 4,265,977 A | 5/1981 | Kawamura et al. |
| 4,291,139 A | 9/1981 | Halasa et al. |
| 4,332,858 A | 6/1982 | Saitoh et al. |
| 4,704,110 A | 11/1987 | Raykovitz et al. |
| 4,712,808 A | 12/1987 | Beh-Forrest et al. |
| 4,722,650 A | 2/1988 | Allen et al. |
| 4,889,884 A | 12/1989 | Dust et al. |
| 4,942,195 A | 7/1990 | Flanagan et al. |
| 5,270,396 A | * 12/1993 | Farrar et al. ................. 525/271 |
| 5,284,915 A | 2/1994 | Custro et al. |
| 5,296,540 A | 3/1994 | Akiyaman et al. |
| 5,304,598 A | 4/1994 | Custro et al. |
| 5,356,963 A | 10/1994 | Kauffman et al. |
| 5,369,175 A | 11/1994 | Hoximeier et al. |
| 5,405,903 A | 4/1995 | Van Westrenen et al. |
| 5,451,621 A | 9/1995 | Usmani et al. |
| 6,162,874 A | * 12/2000 | Wollum et al. ............. 525/316 |

OTHER PUBLICATIONS

Adhesives Age; Nov. 1997.

* cited by examiner

Primary Examiner—James J. Seidleck
Assistant Examiner—Olga Asinovsky
(74) Attorney, Agent, or Firm—David G. Burleson; Ann Skerry

(57) ABSTRACT

A process of preparing a diblock/triblock composition in a single reaction vessel includes reacting a first monomer, such as styrene, with a first portion of an anionic catalyst in a suitable solvent to form a first polymer block of the triblock. A second step includes adding a second monomer, such as butadiene (when the first monomer is styrene). This forms a second block of the triblock and a first block of the diblock. A further addition of the first monomer completes the diblock and triblock interpolymers. At least a portion of the diblock and/or triblock interpolymers are functionally terminated with a functional terminating agent, such as cyclohexene oxide or isopropanol, to provide the blocks with a functional group. The functional group and the proportion of the interpolymers functionally terminated are selected to provide desired adhesive properties for a particular application.

20 Claims, No Drawings

MEANS OF PRODUCING HIGH DIBLOCK CONTENT THERMOPLASTIC ELASTOMERS WITH FUNCTIONAL TERMINATION

FIELD OF THE INVENTION

The present invention relates generally to polymerizations, specifically to a method for preparing a combination of di-block and tri-block copolymers in a single reaction vessel.

BACKGROUND OF THE INVENTION

Blends of styrene-butadiene diblock and styrene-butadiene-styrene tri-block interpolymers have a variety of applications. In an adhesive composition, the diblock polymer provides tack strength, while the triblock polymer provides the composition with its elastomeric properties. One process for preparing such composition is to physically blend the triblock and the diblock copolymers which have been prepared independently. However, such a process requires a large blending capacity and is therefore undesired.

Moreover, it will be appreciated that the separate preparation of the diene diblock and triblock copolymers makes the control of the final composition of the mixture extremely difficult. Better adhesive properties generally result by having identical molecular weights of the styrene blocks in the diblock and triblock polymers. When blending a triblock with a diblock interpolymer, it is difficult, if not impossible to achieve this optimal ratio.

Another method of forming diblock/triblock compositions involves partial coupling of live diblock species. Suitable coupling agents include reactive halogen compounds, such as, for example, dimethyl dichlorosilane, silicon tetrachloride, methylene bromide, phosphorus trichloride, or divinyl benzene. This method can achieve matching of the polystyrene molecular weights in the diblock and triblock, if a solvent is used in which the polystyrene is completely soluble. If the polystyrene is insoluble in the solvent (for example, hexane), the polystyrene maximum molecular weight is limited. For acceptable adhesive properties, it is desirable to exceed this maximum molecular weight.

Another method of forming diblock/triblock compositions is by using a multiple catalyst charge and by staggered addition of the monomers and deactivation of a portion of the growing polymer chains before or during addition of a subsequent monomer. For example, a high diblock TPE can be formed by charging a lithium catalyst with styrene and allowing polymerization, followed by further addition of the catalyst and butadiene. Once this has polymerized, a further charge of styrene is added. The resulting compositions, however, exhibit poor adhesion to stainless steel and polypropylene, and have low cohesive tensile strength.

The present invention provides a new and improved block copolymer blend, process of forming, and an adhesive composition incorporating block copolymer blend, which overcomes the above-referenced problems and others.

SUMMARY OF THE INVENTION

Briefly, the present invention provides a process for preparing a polymer composition which includes a triblock interpolymer and a diblock interpolymer. The process includes polymerizing vinyl aromatic monomer in an inert hydrocarbon solvent in the presence of an anionic catalyst system until substantially complete conversion to a living vinyl aromatic polymer has occurred. A conjugated diene monomer is added to copolymerize with the living vinyl aromatic polymer. A first terminating agent is then added in sufficient amount to terminate at least a portion of but less than all of the product of step (b), thereby forming the diblock interpolymer. A second portion of vinyl aromatic monomer is added, then a second terminating agent, thereby forming the triblock interpolymer. Optionally, at least one of the first terminating agent and the second terminating agent includes a functional terminating agent.

In another aspect, a block copolymer composition is provided. The composition includes a first block interpolymer of the general formula $A_1B_1A_2$ and a second block interpolymer of the general formula $A_1B_1$. $A_1$ and $A_2$ independently represent a poly(vinyl aromatic) block and $B_1$ represents a poly(conjugated diene) block. At least one of the block interpolymers is terminated by a functional group selected from the group consisting of hydroxyl, alkoxysilane, amine, and carboxyl.

In another aspect, an adhesive composition is provided. The adhesive composition includes 15–40% by weight of a polymer composition as previously described, 40–70% by weight of a compatible tackifying resin and 5–30% by weight of a plasticizing oil.

In another aspect, a process is provided for preparing a diblock/triblock polymer composition in which at least one of the diblock and triblock polymers is functionalized. The process includes polymerizing one of a vinyl aromatic monomer and a conjugated diene monomer in an inert hydrocarbon solvent in the presence of a first portion of an anionic catalyst system until substantially complete conversion to a first living polymer has occurred. The first living polymer contributes a first block of a triblock interpolymer and a first block of a diblock interpolymer. The first block of each of the triblock and diblock interpolymers each includes either a first vinyl aromatic polymer or a first diene polymer. The other of the vinyl aromatic monomer and the conjugated diene monomer is added, allowing formation of a midblock of the triblock interpolymer, and a second block of the diblock interpolymer. At least one of a functional terminating agent and a protic terminating agent is added in a sufficient amount to terminate less than all of the product of step. A second portion of one of a vinyl aromatic monomer and a conjugated diene monomer is added followed by at least the other of the functional terminating agent and the protic terminating agent, forming the triblock interpolymer and the diblock interpolymer.

The following definitions apply hereinthroughout unless a contrary intention is expressly indicated:

An "interpolymer" is a polymer comprising mer units derived from two or more different monomers.

By "living polymer," it is meant that a polymer, prepared by anionic polymerization, has active terminals (e.g., lithium terminals) which enable the polymer to undergo further polymerization reactions or to be terminated through a suitable terminating process.

DETAILED DESCRIPTION OF THE PREFERRED EMBODIMENTS

The process of the present invention includes the sequential steps of:

(1) polymerizing a vinyl aromatic monomer $A_1$ such as styrene, in an inert hydrocarbon solvent in the presence of a suitable catalyst until substantially complete conversion to a living vinyl aromatic polymer;

(2) adding a conjugated diene monomer B, such as butadiene, and allowing the conjugated diene monomer to polymerize until substantially complete conversion;

(3) adding a terminating agent to terminate a portion of the living polymers;

(4) adding a second portion of a vinyl aromatic monomer A and allowing it to polymerize until substantially complete conversion; and (5) adding a terminating agent to terminate the remainder of the living polymers.

The terminating agent used in step (3) is preferably a functional terminating agent, and the terminating agent used in step (5) is preferably a protic terminating agent, although a functional terminating agent may be used in both steps (3) and (5) or any other combination of the two terminating agents may be used.

The functional terminating agent includes a functional group (i.e, a group other than H), which is selected to add functionality to the resulting diblock/triblock blend.

The protic terminator removes residual catalyst (lithium, in the case of an organolithium catalyst) from the interpolymers formed, and thereby prevents further reaction of the copolymers. Where both a functional terminating agent and a protic terminating agent are used, the protic terminating agent is preferably used after the functional terminating agent.

After the polymerization has been terminated, the product can be isolated, e.g., by drum drying, steam stripping, or flash evaporation.

By the term "substantially complete conversion," it is meant that the polymerization reaction is allowed to proceed in each step until at least 90%, more preferably, at least 95%, and most preferably, at least 98% of the initially charged monomer has been polymerized. As a result, the blocks are relatively pure (i.e., free of the other monomer(s)).

The process results in a block copolymer composition including a triblock copolymer of the general formula $A_1 B_1 A_2$, and a diblock copolymer of the general formula $A_1 B_1$, where:

$A_1$ represents a poly(vinyl aromatic block) formed in step 1;

$A_2$ represents a poly(vinyl aromatic block) formed in step 3;

$B_1$ represents a poly(conjugated diene block) formed in step 2; and $A_1$ and $A_2$ may be the same or different.

The above described process may be illustrated by the following reaction scheme, where T represents a functional group on the interpolymer derived from the functional terminating agent T—X added in step (3). An additional step (5) is used to represent addition of a protic terminating agent P—H.

| Step | Add | Products |
|------|-----|----------|
| (1): | A + Li | $A_1$-Li |
| (2): | B | $A_1$-$B_1$-Li |
| (3): | T-X | $A_1$-$B_1$-Li + $A_1$-$B_1$-T + XLi |
| (4): | A | $A_1$-$B_1$-$A_2$-Li + $A_1$-$B_1$-T |
| (5): | P-H | $A_1$-$B_1$-$A_2$H + $A_1$-$B_1$-T |

In the above reaction scheme, only a portion of the polymer chains are terminated with the terminating agent T, while the remainder of the chains are terminated by the protic terminating agent (replacing the positively charged Li with H) in step (5).

The conjugated diene blocks $B_1$ in the diblock and triblock are substantially identical. By "substantially identical," it is meant that the ratio of the molar weights of the two blocks is preferably from about 0.9 to 1.1, more preferably, 0.095 to 1.05, and most preferably is equal to 1.

The approximately equal B blocks in the diblock and triblock interpolymers is in contrast to other methods of preparing diblock triblock mixtures, which often result in the midblock in the triblock having a molecular weight of approximately twice that of the equivalent block in the diblock.

Similarly, the vinyl aromatic blocks $A_1$ in the diblock and triblock are also substantially identical, i.e., the ratio of the molar weights of the two blocks is preferably from about 0.9 to 1.1, more preferably, 0.095 to 1.05, and most preferably is equal to 1. By control of the two vinyl aromatic monomer additions, the vinyl aromatic blocks $A_1$ and $A_2$ in the triblock may also be substantially identical, i.e., the ratio of the molar weights of the two blocks is preferably from about 0.9 to 1.1, more preferably, 0.095 to 1.05, and most preferably is equal to 1.

The vinyl aromatic monomer can be one or more of styrene, a-methyl styrene, α-methyl styrene, p-methyl styrene, p-tert-butyl styrene, and 1,3,dimethyl styrene. Styrene is the most preferred. For example, $A_1$ and $A_2$ may be derived from randomly copolymerized styrene and α-methyl styrene, although both A blocks are preferably homopolymer blocks. $A_1$ and $A_2$ may be derived from the same or different monomer(s).

The conjugated diene monomer is preferably any conjugated diene containing from 4 to 8 carbon atoms, such as 1,3-butadiene, 2-methyl-1,3-butadiene (isoprene), 2,3-dimethyl-1,3-butadiene, 1,3-pentadiene, 1,3-hexadiene, or mixtures thereof, of which 1,3-butadiene, and/or isoprene are preferred. For example, $B_1$ may be derived from randomly copolymerized butadiene and isoprene, or one or more blocks of each of butadiene and isoprene) although it is preferred that the $B_1$ blocks in the diblock and triblock are homopolymer blocks.

The inert hydrocarbon solvent may be any known solvent utilized in the polymerization arts. Examples of suitable solvents include linear or branched aliphatic hydrocarbons, such as n-hexane and isopentane, cyclic aliphatic hydrocarbons, such as cyclohexane, cycloheptane, and cyclopentane, alone or in a combination of two or more such solvents. Hexane and mixtures of cyclohexane and hexane are particularly preferred solvents.

The functional terminating agent is selected so as to provide functionality, i.e., impart desirable properties to the resultant interpolymer composition. The interpolymer compositions are particularly suited for use as adhesives, alone or with other components of an adhesive composition. For these uses, functional groups which add desirable adhesive properties are selected. The properties are chosen dependent on the specific end use. For example, one functional group may improve peel adhesion to stainless steel, while another to polypropylene or polyethylene. In this respect, for example, terminating agents which provide hydroxyl functional groups improve adherence to polyethylene and polypropylene.

On addition of the functional terminator, the living polymer anions on the diblock interpolymers are provided with a functional group. Adding a protic terminator in step (5) terminates the triblock with an H group, although it will be appreciated that functional groups may be placed on both the diblock and triblock, or on the triblock alone, by changing the terminating agents added. For example, steps (3) and (5) may separately include any one of:

(a) adding a functional terminating agent;
(b) adding a protic terminating agent;
(c) adding a functional terminating agent followed by a protic terminating agent;
(d) adding a protic terminating agent, followed by a functional terminating agent.

In the present invention, use of a functional terminating agent in at least one of steps (3) and (5) to functionally terminate at least a portion of the diblock and/or triblock interpolymers is preferred. Functional termination of the diblock interpolymers is most preferred.

Exemplary functional terminators are shown in TABLE 1, accompanied by the functional group provided in the diblock and triblock polymers.

TABLE 1

| Functional Terminator | Functional Group |
| --- | --- |
| 1. monofunctional epoxy compounds, such as cyclohexene oxide | —OH hydroxyl |
| 2 Alkoxysilanes, such as tetraethoxysilane Si(OEt)$_4$ | Alkoxysilane —Si(OAlk)$_3$ such as ethoxysilane —Si(OEt)$_3$ |
| 3. Imines, particularly condensation products of benzaldehydes and amines, such as Schiff Bases, e.g. Dimethylaminobenzilidene butylamine | Amine —NH(R) |
| 4. carbon dioxide $CO_2$ | Carboxyl —COOH |

The protic terminating agent can be any one or more commonly known active hydrogen compounds, such as water (e.g., as steam), alcohols, phenols, and carboxylic acids. Examples include methanol, ethanol, isopropanol, and ethyl hexanoic acid.

The functional terminating agent is added in a sufficient quantity (i.e., in less than a stoichiometric amount) to terminate only a portion of the interpolymer chains. For example, 25, 50 or 80% of the interpolymer chains can be terminated with the functional group in step (3), while the remainder are protically terminated in step (5). In this way, the percentage of functionally terminated interpolymer chains can be selected to provide optimal properties of the composition, according to its intended use. Additionally, the ratio of diblock to triblock is also determined by the amount of terminating agent added in step (3).

The polymerization process is one which yields a living polymer (i.e., one having a reactive end group) after steps 1–4. The reactive end group is typically a negatively charged end group, which forms an ionic bond or other ionic association with a positively charged species, such as a metal cation. A variety of polymerization catalysts are suited to catalyzing steps 1–4, and forming a living polymer.

Preferred catalysts are organic alkali metal compounds, particularly organolithium catalysts. The organolithium catalyst may be any organolithium compound which acts as an initiator in polymerization having the general formula RLi, where R is selected from the group consisting of alkyls, cycloalkyls, alkenyls, aryls, and aralkyls having from 1 to about 20 carbon atoms. Exemplary R groups include n-butyl, s-butyl, methyl, ethyl, isopropyl, cyclohexyl, allyl, vinyl, phenyl, benzyl, and the like. Suitable organic compounds of lithium include organolithium or lithium salts of an organic acid, such as alkyl lithium compounds, lithium salts of alcohols, lithium salts of glycol ethers, lithium salts of alcohols, phenols, thioalcohols, and thiophenols, lithium salts of dialkylaminoethanol, lithium salts of secondary amines, lithium salts of cyclic imines, and the like. A preferred class of organolithium compounds is the alkyl lithium compounds, wherein the alkyl group may be a linear alkyl compound or a cycloalkyl group. Preferred organic compounds of lithium include alkyl lithium having 2 to 10 carbon atoms, such as methyl lithium, ethyl lithium, n-propyl lithium, n-butyl lithium, sec-butyl lithium, isoamyllithium, and the like, alone or in combination. Preferred alkyl lithium compounds are n-butyl lithium and sec-butyl lithium, with sec-butyl lithium being particularly preferred. The anionic catalyst may be a combination of two or more catalysts. Other so-called "living catalysts" (anionic catalyst systems) may be employed in addition to, or in place of the organolithium catalyst. These include organic salts or complexes of rare earth (lanthanum series) metals, organomagnesium compounds, organoaluminum compounds, organozinc compounds, and organic compounds of barium or strontium. Suitable catalytic systems include:

I.
  (a) a salt or a complex of a lanthanide series metal; and
  (b) an organomagnesium compound.

II.
  (a) a salt or a complex of a lanthanide series metal;
  (b) an organomagnesium compound; and
  (c) an organic compound of lithium.

III.
  (a) an organomagnesium compound;
  (b) an organic compound of lithium; and
  (c) an organic compound of barium or strontium.

IV.
  (a) an organomagnesium compound;
  (b) an organic compound of lithium;
  (c) an organic compound of barium or strontium;
  (d) an organoaluminum or organozinc compound.

The lanthanide series metal may be any rare earth element of those having an atomic number of 57 (lanthanum) to 71 (lutetium). However, the polymerization activity of certain of these elements, e.g., samarium, in previously described catalysts is low. Therefore, a compound of cerium, praseodymium, neodymium, gadolinium, terbium, or dysprosium is preferred. A mixture of two or more rare earth elements may be used. A compound of neodymium or "didymium" (which is a mixture of rare earth elements containing approximately 72% neodymium, 20% lanthanum, and 8% praseodymium) is particularly preferred.

Examples of compounds suitable as the salt or a complex of a lanthanum metal are "didymium" versatate (derived from Versatic acid®, a synthetic acid composed of a mixture of highly branched isomers of $C_{10}$ monocarboxylic acids, sold by Shell Chemicals), neodymium versatate, and praseodymium (2, 2, 6, 6-tetramethyl-3,5-heptane dione). Didymium and neodymium versatate are preferred on the grounds of ready solubility, ease of preparation, and stability.

Other lanthanides useful as the salt or a complex of a lanthanum metal are organic acid salts of lanthanum or organic phosphoric acid salts of cerium. The organic acid salt of lanthanum or organic phosphoric acid salt of cerium can readily be obtained, for example, by making an alkali metal salt of an organic acid to react with a chloride of lanthanum or cerium in water or an organic solvent, such as an alcohol, ketone, or the like. The organic acid salt of lanthanum or organic phosphoric acid salt of cerium may contain inorganic salts or lanthanum or cerium or organic acids as impurities in small amounts.

Exemplary organic acids that may be used to form the lanthanide salt/complex include organic acid compounds, including compounds of alcohols, thioalcohols, phenols and thiols, such as: methyl alcohol, ethyl alcohol, and propyl alcohol, isopropyl alcohol, tert-butyl alcohol; carboxylic acids or sulfur analogues, such as isovaleric acid, caprylic acid, octanoic acid, lauric acid, myristic acid, palmitic acid, stearic acid, oleic acid, linoleic acid, cyclopentanecarboxylic acid, naphthenic acid, ethylhexanoic acid, pivalic acid; alkyl aryl sulfonic acids, such as dodecylbenzenesulfonic acid, tetradecyl benzenesulfonic acid, hexadecyl benzenesulfonic acid, octadecylbenzenesulfonic acid, dibutyl naphthalene-sulfonic acid, n-hexyl-naphthalenesulfonic acid, dibutylphenyl sulfonic acid; mono-alkyl esters of sulfuric acid, such as sulfuric acid mono-ester of lauryl alcohol, sulfuric acid mono-ester of oleyl alcohol, sulfuric alcohol acid mono-ester of stearyl alcohol; phosphate diesters of ethylene oxide adduct of alcohol or phenol, such as phosphate diester of ethylene oxide adduct of dodecyl alcohol, or of octyl alcohol; phosphite diesters, such as phosphite diester of ethylene oxide adduct of dodecyl alcohol or of stearyl alcohol; pentavalent organic phosphoric acid compounds, such as dibutyl phosphate, dipentyl phosphate; trivalent phosphorous acids such as bis(2-ethylhexyl)phosphite, bis(1-methylheptyl)phosphite, bis(2-ethylhexyl)phosphinous acid.

Exemplary organomagnesium compounds are of the general formula $MgR^1R^2$, where $R^1$ and $R^2$ are aliphatic hydrocarbon groups or aromatic hydrocarbon groups, such as alkyl, cycloalkyl, aryl, aralkyl, allyl, or cyclodiene groups, which may be the same or different. Examples include diethylmagnesium, di-n-propylmagnesium, di-isopropylmagnesium, and the like, alone or in combination, where dibutyl magnesium is preferred.

Exemplary barium or strontium organic compounds include barium or strontium salts of aliphatic or aromatic groups, such as salts of alcohols, phenols, thioalcohols, thiophenols, carboxylic acids or sulfur analogs, glycol ethers, dialkylaminoalcohols, diarylaminoalcohols, secondary amines, cyclic imines, sulfonic acids, and sulfate esters, alone, or in combination. Examples include salts of ethyl alcohol, n-propyl alcohol; salts of ethanethiol, 1-butanethiol, thiophenol, cyclohexanethiol, and 2-naphthalenethiol; salts of isovaleric acid, caprilic acid, lauric acid, myristic acid, ethylene glycol monomethyl ether, ethylene glycol monoethyl ether, dimethylaminoethanol, diethylaminoethanol, di-n-propylaminoethanol dimethylamine, diethylamine, ethyleneimine, triethyleneimine, pyrrolidine, piperidine, hexamethylene imine, butanesulfonic acid, hexanesulfonic acid, decanesulfonic acid; sulfate esters of lauryl alcohol, oleyl alcohol, stearyl alcohol, and the like.

Exemplary organoaluminum compounds are of the general formula $Al(R^3)(R^4)(R^5)$, where $R^3$, $R^4$, and $R^5$ may be the same or different and are selected from hydrogen, aliphatic hydrocarbon groups, or aromatic hydrocarbon groups, but not all hydrogen. Examples include triethyl aluminum, tri-isobutylaluminum, tri-n-propylaluminum, tri-n-hexylaluminum, diethyl aluminum monohydride, and the like.

Suitable organozinc compounds are of the general formula $R^6$—Zn—$R^7$, where $R^6$ and $R^7$ may be the same or different and are selected from hydrogen, aliphatic hydrocarbon groups, or aromatic hydrocarbon groups, but not both hydrogen. Examples include diethyl zinc, di-n-propyl zinc, di-iso-amyl zinc, di-isobutyl zinc, and the like.

If desired, the polymerization may be carried out in the presence of a polar modifier, such as a Lewis base, e.g., tetrahydrofuran (THF). Examples of other polar compounds are (a) ethers, such as dimethyl ether, diethyl ether, diphenyl ether, dibenzyl ether, and anisole; (b) amines, such as trimethylamine, triethylamine, pyridine, and tetramethyl ethylene diamine; (c) thioethers, such as thiophene; and (d) polyethers, such as 1,2-dimethoxy ethane, glyme, and diglyme.

The polymerization reactions may be carried out at equal or different temperatures within the range of from about −10° C. to 150° C., preferably, 10–110° C. The reaction pressure is not bound to any particular value, but should be sufficient to maintain the reaction mixture in the liquid phaseIn step (1) of the reaction scheme provided above, a reactor suited to mixing the polymerization mixture and heating or cooling it is charged with a solvent, such as cyclohexane, the first monomer A, such as styrene, and sufficient organolithium catalyst (such as an organolithium catalyst) to generate polyvinyl aromatic (in this case polystyrene) blocks of a desired molecular weight, preferably of the order of 5,000–21,000 weight average molecular weight (Mw). A polar modifier, such as THF, is optionally added at this stage to improve uniformity of polymer chain length and/or allow a lower reaction temperature. The styrene may be pre-blended with a portion of the solvent to aid mixing.

The reactor can then be heated to an appropriate temperature, preferably about 20–65° C. Once the monomers have been polymerized, or substantially polymerized, the mixture is preferably cooled and, in step (2), the second monomer, such as butadiene, is charged. As for the styrene, the butadiene may be pre-blended with solvent. The temperature is then raised to about 55–100 ° C. and the polymerization allowed to proceed until substantially all the butadiene has polymerized with the living styrene polymers.

In step (3) the terminating agent is added, as discussed above.

In step (4) a further addition of monomer A (e.g., styrene) is added and the reactor is heated to an appropriate temperature, preferably about 55–100° C. The polymerization is allowed to proceed until substantially all the styrene has polymerized with the remaining living styrene-butadiene interpolymers.

No further addition of catalyst is needed in step (4), unless it is desired to continue the reaction scheme to form a mixture of diblock triblock and 4-, or more-block interpolymers. Further monomer additions can be performed, if desired, to produce multiblock polymers, with or without additional charges of catalyst. For diblock/triblock compositions, however, the reaction is preferably quenched, in step (5), by addition of a protic terminator. Or a functional terminator may be added at this stage to functionally terminate at least a portion of the living triblock interpolymers. In this case, step (5) preferably also includes addition of a protic terminator following the step of functional termination of a portion of the triblock polymers.

Further steps may be included, such as the addition of an antioxidant or stabilizer to the composition. Exemplary stabilizers or antioxidants include high molecular weight hindered phenols, such as S- and P-containing phenols. Representative hindered phenols include 1,3,5-trimethyl, 2,4-tris(3,5-di-tertbutyl-4-hydroxybenzyl)benzene; pentaerythrityl tetrakis-3-tris(3,5-di-tertbutyl-4-hydroxybenzyl) propionate, and the like.

In an alternative embodiment, partial functional termination is used in combination with further additions of monomers. A functional terminator, such as cyclohexene oxide, can be added to the polymerization mixture. An additional charge or charges of one or more of the monomers is then added to the polymerization mixture. This provides a mixture of di and triblock functionally or protically terminated interpolymers, together with multiblock polymers which may be longer than the di and triblock interpolymers (depending on whether additional catalyst charges are added) and may be functionally or protically terminated.

As indicated above, the process of the present invention is not limited to diblock and triblock compositions. The process can be extended, prior to final quenching, to add further charges of one or more monomers. For example, by adding a further charge of diene monomer B after step (5), the resulting composition can include a 4-block interpolymer $A_1—B_1—A_2—B_2$ and a triblock interpolymer $A_1—B_1—A_2$, which both may be protically or functionally terminated, and where the monomers used to form blocks $B_1$ and $B_2$ may be the same, or different.

The vinyl aromatic content of the triblock and diblock copolymers may vary over a wide range. For adhesive formulations, the vinyl aromatic content is preferably not too high, i.e., does not exceed 55% by weight, based on the total weight of the block copolymer. More particularly, the vinyl aromatic content of both diblock and triblock copolymers is preferably from 10–50% by weight, more preferably, from 12–40% by weight, and, most preferably, from 14–35% by weight, although higher or lower vinyl aromatic content may be desirable for some applications.

The molecular weight of the vinyl aromatic blocks is not bound to specific values, but weight average molecular weights $M_w$ may suitably be from 5,000 to 30,000, preferably 10,000 to 21,000. The apparent molecular weight of the triblock copolymer may suitably be from 50,000 to 400,000, preferably, 70,000 to 125,000. Molecular weights, throughout the specification, are as measured by gel permeation chromatography (GPC) using polystyrene calibration standards.

In another embodiment, a similar process is used to form a block copolymer composition including block copolymers in a solvent, such as a linear hydrocarbon, e.g., hexane, or a mixture of solvents, such as a hexane/cyclohexane mixture, in which the poly [vinyl aromatic] polymer, e.g., polystyrene, is insoluble or poorly soluble.

In this embodiment a small amount of a poly[conjugated diene], such as polybutadiene, is formed first. This acts as a dispersant for the poly [vinyl aromatic] polymer, formed in a second step. The reaction scheme thus may proceed as follows, using the same letters as above to represent the various components and using the letter b to represent a small amount of conjugated diene or conjugated diene polymer block:

| Step | Add | Products |
|---|---|---|
| (1a) | b + Li | b-Li |
| (1b): | A + Li | $A_1$-Li + b-$A_1$-Li |
| (2): | B | $A_1$-$B_1$-Li + b-$A_1$-$B_1$-Li |
| (3): | T-X | $A_1$-$B_1$-Li + b-$A_1$-$B_1$-Li + $A_1$-$B_1$-T + b-$A_1$-$B_1$-T + LiX |
| (4) | A | $A_1$-$B_1$-$A_2$-Li + b-$A_1$-$B_1$-$A_2$-Li + $A_1$-$B_1$-T + b-$A_1$-$B_1$-T |
| (5): | P-H | $A_1$-$B_1$-$A_2$-H + b-$A_1$-$B_1$-$A_2$-H + $A_1$-$B_1$-T + b-$A_1$-$B_1$-T |

Only a small amount of poly [conjugated diene] is needed to disperse the poly [vinyl aromatic] polymer. Thus, step (1a), in this embodiment, includes charging only a small proportion of conjugated diene monomer, such as butadiene, preferably less than about 20%, more preferably, less than 10%, and most preferably, around 5% of the total conjugated diene, and a portion of the catalyst, preferably less than half the catalyst charge, more preferably, about one third of the total catalyst charge, to generate a small amount of b-Li, e.g, polybutadiene of relatively low molecular weight. Preferably, the molecular weight of the polybutadiene formed in step (1a) is of the order of about 4500.

The polybutadiene is generated in a sufficient amount to disperse the vinyl aromatic monomer added in step (1b) and solubilize the polystyrene. Preferably, sufficient vinyl aromatic monomer and enough catalyst are added in step (1b) to ensure that the styrene blocks of the resulting copolymers are of equivalent molecular weight. Because of the small amount of b-Li generated in step (1a) step (1b) results in the formation of a small amount of b-$A_1$—Li and a larger amount of $A_1$—Li, e.g., living polystyrene.

The method for steps 2)–5) is otherwise the same as for the first embodiment. Step (2) results in the formation of a small amount of b-$A_1$—$B_1$—Li and a larger amount of $A_1$—$B_1$—Li, corresponding to the amounts of b-$A_1$—Li and $A_1$—Li produced in step (2).

In step (3), a functional terminating agent is charged to terminate a portion, preferably about half, of the live polymers. This leaves a portion of the living polymers $A_1$—$B_1$—Li+b—$A_1$—$B_1$—Li available to undergo further polymerization and quenches the remaining polymers to form $A_1$—$B_1$—T+b—$A_1$—$B_1$—T. As may be appreciated, the functionally terminated diblock $A_1$—$B_1$—T is in a substantially larger amount than the b—$A_1$—$B_1$—T interpolymer. As discussed for the first embodiment, the functional terminating agent may be totally or partially replaced with a protic terminating agent at this stage, and likewise in step (5).

In step (4), a further amount of vinyl aromatic monomer is added. This results in the formation of a small amount of b—$A_1$—$B_1$—$A_2$—Li and a larger amount of $A_1$—$B_1$—$A_2$—Li. The terminated polymers formed in step (3) do not, of course undergo further reaction.

In step (5), a protic terminator is added to terminate the remainder of the catalyst. The final products are: a protically terminated triblock $A_1$—$B_1$—$A_2$—H, a functionally terminated diblock $A_1$—$B_1$—T, and small amounts of the interpolymers: b—$A_1$—$B_1$—$A_2$—H and b—$A_1$—$B_1$—T.

The b—$A_1$—$B_1$—$A_2$—H and b—$A_1$—$B_1$—T, being in relatively small amounts, have little effect on the overall properties of the composition. Thus, the overall properties of the copolymer composition are primarily dependent on the $A_1$—$B_1$— $A_2$—H and $A_1$—$B_1$—T copolymers. Additionally, while b–$A_1$—$B_1$—T and b—$A_1$—$B_1$—$A_2$—H are actually tri- and four-block copolymers, they tend to function as di- and tri-blocks, respectively, because of the small amount of diene monomer present.

The present invention also relates to a block copolymer composition comprising:

(1) a triblock copolymer $B_1$—$A_1$—$B_2$ having two different or equal polymer end blocks $B_1$, $B_2$ derived from conjugated diene monomer, and one polymer midblock $A_1$ derived from vinyl aromatic monomer; and (2) a diblock polymer $A_1$—$B_2$ having one polymer block $A_1$ derived from a vinyl aromatic monomer and one polymer block $B_2$ derived from a conjugated diene monomer.

The process for forming the composition is the same as that described above, except in that conjugated diene monomer is charged in place of vinyl aromatic monomer, and vice versa. Since the diene monomer is soluble in either cyclic or linear hydrocarbon solvents, the composition may be formed, for example, in hexane, without the need for step (1a). The process proceeds with step (1b) by charging diene monomer and all of the catalyst into the reactor. Step (2) charges styrene, and step (4), another charge of butadiene.

In accordance with yet another embodiment of the invention, steps (3) and (4) of the first embodiment are reversed, as follows:

| Step | Add | Products |
|---|---|---|
| (1): | A + Li | $A_1$-Li |
| (2): | B + Li | $A_1$-$B_1$-Li + $B_1$-Li |
| (3): | A | $A_1$-$B_1$-$A_2$-Li + $B_1$-$A_2$-Li |
| (4): | T-X | $A_1$-$B_1$-$A_2$-T + $B_1$-$A_2$-T + $A_1$-$B_1$-$A_2$-Li + $B_1$-$A_2$-Li + XLi |
| (5): | P-H | $A_1$-$B_1$-$A_2$-T + $B_1$-$A_2$-T + $A_1$-$B_1$-$A_2$-H + $B_1$-$A_2$-H |

In the above reaction scheme, only a portion of the polymer chains are terminated with the terminating agent T—X after step (3), while the remainder of the chains are terminated by the protic terminating agent (replacing the positively charged Li with H) in step (5). In this embodiment, the functional terminating agent is distributed over both the diblock and triblock copolymers.

The compositions of the present invention are suited to incorporation into adhesive compositions, into asphalt compositions, and for a variety of other uses. To form an adhesive composition, the diblock/triblock composition may be combined with a variety of tackifying resins, plasticizing oils, waxes, stabilizers, and the like. Exemplary tackifying resins include hydrocarbon resins, synthetic polyterpenes, rosin esters, natural terpenes, and the like. Examples include natural and modified rosins, such as gum rosin, wood rosin, hydrogenated rosin; glycerol and pentaerythrol esters of natural and modified rosins; copolymers and terpolymers of natural terpenes, e.g., styrene/terpene; polyterpene resins; phenolic modified terpene resins and hydrogenated derivatives thereof; aliphatic petroleum hydrocarbon resins having a Ball and Ring softening point of from about 70–135° C.; aromatic petroleum hydrocarbon resins and hydrogenated derivatives thereof; and alicyclic petroleum hydrocarbon resins and hydrogenated derivatives thereof.

Exemplary stabilizers or antioxidants include high molecular weight hindered phenols, such as sulfur and phosphorus containing phenols. Representative hindered phenols include 1,3,5-trimethyl, 2,4-tris(3,5-di-tertbutyl-4-hydroxybenzyl)benzene; pentaerythrityl tetrakis-3-tris(3,5-di-tertbutyl-4-hydroxybenzyl)propionate, and the like.

Plasticizing oils are preferably present in the adhesive composition to provide wetting action and/or viscosity control. Exemplary plasticizing oils include not only the usual plasticizing oils, but also olefin oligomers and low molecular weight polymers as well as vegetable and animal oils, and their derivatives.

Various petroleum-derived waxes may be used in order to impart fluidity in the molten condition to the adhesive and flexibility to the set adhesive. Exemplary waxes include paraffin and microcrystalline waxes having a melting point within the range of about 55–110° C., as well as synthetic waxes, such as low molecular weight polyethylene or Fischer-Tropsch waxes.

For example, a hot melt adhesive may be formed as follows:

(a) 15–40% by weight of a diblock/triblock composition, preferably comprising functionally terminated $A_1$—$B_1$—$A'_1$—T and $B_2$—$A'_2$—T blocks, as described above, and/or $A_1$—$B_1$—$A'_1$ and $B_2$—$A'_2$ blocks;

(b) 40–70% of a compatible tackifying resin;

(c) 5 to 30% by weight of a plasticizing oil;

(d) 0 to 5% by weight of a petroleum derived wax; and (e) 0.1 to 2% by weight of a stabilizer.

The invention is further illustrated by the following examples, without intending to limit the scope of the invention.

EXAMPLES

Example 1

Preparation of a Diblock/Triblock Composition from Styrene and Butadiene Partially Functionally Terminated with Cyclohexene Oxide A reactor fitted with a stirrer and heating/cooling jacket was charged with 10.06 kg hexane, 0.27 kg of a blend of 33.0% butadiene in hexane, 45.4 g of 3% butyl lithium catalyst in hexane, and 2.0 g of a THF/oligomeric oxolanopropane polar modifier, sold by Firestone Polymers (Akron, Ohio), as a 15% solution in hexane. The batch temperature was set at 77° C. and heated for 30 minutes. The polymerization mixture was cooled to a temperature of 32° C. A second charge of 92.1 g butyl lithium/hexane solution was added, and then 2.31 kg of a blend of 33.0% styrene in hexane was added, as quickly as possible. The batch temperature was set to 54° C. and the reaction allowed to proceed for a further thirty minutes, after reaching the peak. A sample of the polymerization mixture was taken into a clean, nitrogen purged bottle for analysis.

The reactor was then charged with a further 5.85 kg of the blend of 33.0% butadiene in hexane, as quickly as possible. The batch temperature was set to 77° C. and the reaction allowed to proceed for a further 30 minutes, after reaching the peak. Then, 0.303 kg of a blend of 1% cyclohexene oxide, a functional terminator, in hexane, was added. This amount was sufficient to terminate about 50% of the catalyst, leaving about half of the polymer chains still living and thus able to copolymerize.

After a further 5 minutes, a further 1.13 kg of a blend of 33.0% styrene in hexane was added to the reactor.

After a further 30 minutes, cooling of the jacket was started. The polymerization mixture was transferred to a holding tank to reduce the temperature quickly. Then, 8.9 g of a protic terminator, ethyl hexanoic acid, was added to convert any remaining lithium in the interpolymers to LiOH. 25.4 g of an antioxidant, Irganox 1076, was added to the polymerization mixture and agitated.

The product was drum dried to remove the solvent.

Example 2

Preparation of a Diblock/Triblock Composition from Styrene and Butadiene Partially Terminated with Isopropanol The process of Example 1 was used to prepare a diblock/triblock composition, although in this case, isopropanol was used in place of cyclohexene oxide to terminate about 50% of the catalyst.

Example 3

Preparation of a Triblock Composition from Styrene and Butadiene (Control)

The process of Example 1 was used to prepare a diblock/triblock composition, although in this case, no functional terminating agent was used.

Example 4

Preparation of a Diblock/Triblock Composition from Styrene and Butadiene without Functional Termination Via Multiple Catalyst Charges (Control)

The process of Example 3 was used to prepare a diblock/triblock composition, although in this case, the catalyst charge which accompanied the first addition of styrene was adjusted to ensure that the styrene blocks were of equivalent molecular weight and the weight percent of the diblock in the interpolymer composition was about 50. In a first step, a small amount of butadiene was polymerized in the presence of a first charge of the catalyst (b-Li). Styrene was then copolymerized with a second catalyst charge. (bS—Li+S—Li). Another catalyst charge accompanied a further addition of butadiene (bSB—Li+SB—Li+B—Li).

Example 5
Preparation of a Diblock/Triblock Composition from Styrene and Butadiene without Functional Termination Via Blending a Diblock with a Triblock (Control)

The process was similar to Example 1, except that a diblock of butadiene and styrene was separately prepared and charged to the reactor with the initial hexane, styrene, butyl lithium catalyst, and polar modifier. The diblockwas used in about 50 weight percent of the interpolymer composition.

Example 6
Preparation of a Diblock/Triblock Composition from Styrene and Butadiene Partially Functionally Terminated with Cyclohexene Oxide Example 6 was a repeat of Example 1.

Example 7
Evaluation of Compositions Formed in Examples 1–6

The resulting interpolymer compositions prepared in Examples 1–6 and a sample of Stereon 840™ (a styrene butadiene multiblock polymer with 43% styrene and an MFR of 12, available from Firestone Polymers) were then subjected to a variety of analytical tests, as follows:

Pressure Sensitive Adhesive (PSA) Tests

For these tests the composition was dissolved in toluene and cast on to mylar to produce a tape.

Viscosity, cPs, after stripping the solvent from the adhesive, was measured at four different temperatures, 149° C., 163° C., 177° C. and 204° C., according to ASTM D2196.

Quick Stick, g/cm, was measured according to Pressure Sensitive Tape Council method PSTC-5.

Peel Adhesion, g/cm, was measured on three different substrates, stainless steel, polyethylene, and polypropylene, according to PSTC-1 (ASTM D3330).

SAFT, °•, was measured according to ASTM D4498.

Polyken Tack, g, was measured according to ASTM D2979.

Rolling Ball, cm, was measured according to PSTC-6 (ASTM D3121).

Gardner Color was measured according to ASTM D1544.

Coating Weight (measured in g/100 sq.cm) was measured by coating a sheet of Mylar (DuPont) of known weight/unit area with the composition, weighing a known area, and deducting the weight of Mylar in the sample.

Hot Melt Adhesive Tests

These tests were carried out on the composition in the form of a hot melt adhesive.

Adhesive Tensile was determined by pouring the composition into a mold and allowing it to cool. The specimen is removed from the mold and subjected to standard tensile tests at room temperature.

Viscosity, cPs, was measured at four different temperatures, 149° C., 163° C., 177° C. and 204° C., according to ASTM D 2196.

The results of these tests are provided in TABLE 2. Molecular weights for these compositions, and % styrene, % block styrene, % vinyl butadiene, and % melt indexes are recorded in TABLE 3. Melt index was determined according to ASTM D1238 (MFR 200/5.0 (200° C., 5 kg)).

TABLE 2

| Sample | S-840A | 1 | 2 | 3 | 4 | 5 | 6 |
|---|---|---|---|---|---|---|---|
| PSA RESULTS | | | | | | | |
| Viscosity, cPs | | | | | | | |
| @ 149° C. | 2538 | 3775 | 3475 | 4225 | 3588 | 2930 | 4625 |
| @ 163° C. | 1600 | 2350 | 2120 | 2675 | 2240 | 1825 | 2840 |
| @ 177° C. | 1065 | 1420 | 1400 | 1745 | 1495 | 1208 | 1910 |
| @ 204° C. | 542 | 692 | 695 | 858 | 720 | 568 | 875 |
| Quick Stick, g, cm | 382 | 650 | 820 | 666 | 914 | 689 | 1173 |
| Peel Adhesion, g, cm | | | | | | | |
| Stainless steel | 1229 | 1218 | 1127 | 1377 | 1047 | 1262 | 1565 |
| Polyethylene | 147 | 292 | 277 | 208 | 425 | 257 | 384 |
| Polypropylene | 997 | 961 | 940 | 388 | 942 | 843 | 1233 |
| SAFT, ° C. | 58 | 57 | 56 | 46 | 60 | 57 | 56 |
| Polyken Tack, g | >1000 | >1000 | 966 | >1000 | >1000 | >1000 | >1000 |
| Rollingball, cm | >10 | >10 | >10 | >10 | >10 | >10 | >10 |
| Gardner Color | 2 | 2 | 2 | 2 | 4 | 4 | 3 |
| Coating Weight g/100 sq. cm | 0.2642 | 0.2541 | 0.2718 | 0.2940 | 0.2650 | 0.2897 | 0.3644 |
| HMA Results | | | | | | | |
| Viscosity, cPs | | | | | | | |
| @ 149° C. | 2785 | 2235 | 3195 | 3688 | 3110 | 2790 | 3245 |
| @ 163° C. | 1720 | 1365 | 1975 | 2310 | 1915 | 1725 | 2050 |
| @ 177° C. | 1108 | 895 | 1290 | 1520 | 1260 | 1145 | 1352 |
| @ 204° C. | 552 | 428 | 638 | 745 | 640 | 565 | 615 |
| Adhesive Tensile, kg/sq. cm | 7.94 | 4.36 | 5.11 | 7.90 | 3.31 | 4.12 | 3.53 |

TABLE 3

| Example | Process | Total Molecular Weight | | | Block Styrene Molecular Weight | | | Styrene, wt % | Block Styrene, % as % of styrene | Vinyl Butadiene, % | Melt Index (Cond. G) |
|---|---|---|---|---|---|---|---|---|---|---|---|
| | | Mn | Mw | Mw/Mn | Mn | Mw | Mw/Mn | | | | |
| 1 | partial functional termination | 53,690 | 72,330 | 1.35 | 15,300 | 20,670 | 1.35 | 38.6 | 100 | 17.6 | 4.4 |
| 2 | partial termination | 54,540 | 72,710 | 1.33 | 14,810 | 21,440 | 1.45 | 35.7 | 100 | 11.1 | 11.6 |
| 3 | control | 57,840 | 78,360 | 1.36 | 12,780 | 15,940 | 1.25 | 36.7 | 100 | 12.7 | 5.9 |
| 4 | mutiple catalyst charge | 65,560 | 75,680 | 1.15 | 17,360 | 24,120 | 1.39 | 34.9 | 100 | 14.2 | 6.2 |
| 5 | diblock/triblock blend | 66,120 | 74,450 | 1.13 | 13,680 | 17,440 | 1.28 | 38.3 | 70 | 22.4 | 8.0 |
| 6 | partial functional termination | 50,750 | 81,130 | 1.60 | 14,560 | 19,820 | 1.36 | 38.5 | 100 | 10.0 | 5.6 |

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A process for preparing a polymer composition which includes a triblock interpolymer and a diblock interpolymer, the process comprising the steps of:
   a) polymerizing vinyl aromatic monomer in an inert hydrocarbon solvent in the presence of an anionic catalyst system until substantially complete conversion to a living vinyl aromatic polymer has occurred;
   b) adding a conjugated diene monomer and allowing copolymerization with the living vinyl aromatic polymer;
   c) adding a first terminating agent in sufficient amount to terminate at least a portion of but less than all of the product of step (b), thereby forming the diblock interpolymer;
   d) adding a second portion of vinyl aromatic monomer;
   e) adding a second terminating agent, thereby forming the triblock interpolymer.

2. The process of claim 1, wherein at least one of the first terminating agent and the second terminating agent includes a functional terminating agent.

3. The process of claim 2, wherein the first terminating agent includes a functional terminating agent.

4. The process of claim 2, wherein the functional terminating agent is selected from the group consisting of monofunctional epoxy compounds, alkoxysilanes, imines, carbon dioxide, and combinations thereof.

5. The process of claim 4, wherein the functional terminating agent is selected from the group consisting of cyclohexene oxide, tetraethoxysilane, carbon dioxide, and combinations thereof.

6. The process of claim 2, wherein the functional terminating agent provides the diblock polymer with a functional group selected from the group consisting of hydroxyl, alkoxysilane, amine, and carboxyl.

7. The process of claim 1, wherein the anionic catalyst system is selected from the group consisting of organolithium compounds, organic salts or complexes of rare earth metals, organomagnesium compounds, organoaluminum compounds, organozinc compounds, organic compounds of barium or strontium, and combinations thereof.

8. The process of claim 7, wherein the anionic catalyst system includes an organolithium compound.

9. The process of claim 1, wherein the conjugated diene monomer is selected from the group consisting of conjugated dienes containing from 4 to 8 carbon atoms, and combination thereof.

10. The process of claim 9, wherein the conjugated diene monomer is a conjugated diene containing from 4 to 8 carbon atoms selected from the group consisting of 1,3-butadiene, 2-methyl-1,3-butadiene, 2,3-dimethyl-1,3-butadiene, 1,3-pentadiene, 1,3-hexadiene, and combinations thereof.

11. The process of claim 1, wherein the vinyl aromatic monomer is selected from the group consisting of: styrene, a-methyl styrene, α-methyl styrene, p-methyl styrene, p-tert-butyl styrene, 1,3, dimethyl styrene, and combinations thereof.

12. The process of claim 1, wherein steps a)–d) are carried out in a single reaction vessel.

13. The process of claim 1, further including, prior to step (a):
   (f) polymerizing conjugated diene monomer in an inert hydrocarbon solvent in the presence of a catalyst system until substantially complete conversion to a diene polymer occurs, the diene polymer being present in sufficient amount to solubilize the living vinyl aromatic polymer formed in step (a).

14. The process of claim 13, wherein the conjugated diene monomer used in step (f) amounts to less than about ten percent of a total of the conjugated diene monomers used in the process.

15. The process of claim 14, wherein the conjugated diene monomer used in step (f) amounts to less than about five percent of a total of the conjugated diene monomers used in the process.

16. The process of claim 15, wherein the solvent includes hexane.

17. The process of claim 13, wherein the catalyst used in step (f) is an anionic catalyst system and amounts to less than about one third of the total of the anionic catalyst system used in the process.

18. A block copolymer composition comprising:
   a first block interpolymer of the general formula $A_1B_1A_2$; and
   a second block interpolymer of the general formula $A_1B_1$, where:
      $A_1$ and $A_2$ independently represent a poly(vinyl aromatic) block; and
      $B_1$ represents a poly(conjugated diene) block, at least one of the block interpolymers being terminated by a functional group selected from the group consisting of hydroxyl, alkoxysilane, amine, and carboxyl.

19. An adhesive composition comprising:
   15–40% by weight of the polymer composition of claim 18,
   40–70% by weight of a compatible tackifying resin; and
   5–30% by weight of a plasticizing oil.

20. A process for preparing a diblock/triblock polymer composition in which at least one of the diblock and the triblock polymers is functionalized, comprising the steps of:
- a) polymerizing one of a vinyl aromatic monomer and a conjugated diene monomer in an inert hydrocarbon solvent in the presence of a first portion of an anionic catalyst system until substantially complete conversion to a first living polymer has occurred, the first living polymer contributing a first block of a triblock interpolymer and a first block of a diblock interpolymer, the first block of each of the triblock and diblock interpolymers each comprising either a first vinyl aromatic polymer or a first diene polymer;
- b) adding the other of the vinyl aromatic monomer and the conjugated diene monomer and allowing formation of:
  - i) a midblock of the triblock interpolymer, and
  - ii) a second block of the diblock interpolymer;
- c) adding at least one of a functional terminating agent and a protic terminating agent in a sufficient amount to terminate less than all of the product of step (b);
- d) adding a second portion of one of a vinyl aromatic monomer and a conjugated diene monomer;
- e) adding at least the other of the functional terminating agent and the protic terminating agent, forming:
  - i) triblock interpolymer, and
  - ii) the diblock interpolymer.

* * * * *